United States Patent
Lee

(10) Patent No.: US 9,868,436 B2
(45) Date of Patent: Jan. 16, 2018

(54) METHOD AND DEVICE FOR CONTROLLING START TIME OF ENGINE IN HYBRID VEHICLE

(71) Applicants: Hyundai Motor Company, Seoul (KR); Kia Motors Corporation, Seoul (KR)

(72) Inventor: Chun Hyuk Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 198 days.

(21) Appl. No.: 14/862,965

(22) Filed: Sep. 23, 2015

(65) Prior Publication Data

US 2016/0368484 A1 Dec. 22, 2016

(30) Foreign Application Priority Data

Jun. 19, 2015 (KR) .......................... 10-2015-0087557

(51) Int. Cl.
*B60W 10/02* (2006.01)
*B60W 10/06* (2006.01)
(Continued)

(52) U.S. Cl.
CPC .............. *B60W 20/20* (2013.01); *B60K 6/442* (2013.01); *B60W 10/02* (2013.01); *B60W 10/06* (2013.01);
(Continued)

(58) Field of Classification Search
CPC .... B60W 10/06; B60W 100/02; B60W 10/08; B60W 20/20; B60W 20/11;
(Continued)

(56) References Cited

U.S. PATENT DOCUMENTS

2007/0111849 A1* 5/2007 Ji .......................... F02N 11/006
477/6
2009/0017984 A1* 1/2009 Shibata .................. B60K 6/445
477/3
(Continued)

FOREIGN PATENT DOCUMENTS

JP 2004-108167 A 4/2004
KR 10-2007-0052478 A 5/2007
(Continued)

*Primary Examiner* — Mussa A Shaawat
(74) *Attorney, Agent, or Firm* — Mintz Levin Cohn Ferris Glovsky and Popeo, P.C.; Peter F. Corless

(57) ABSTRACT

A method for controlling a start time of an engine in a hybrid vehicle includes: generating, by a controller, an engine start command before executing start control of the engine in response to an acceleration signal output from an acceleration pedal sensor; determining, by the controller, a gradient of a road on which the hybrid vehicle travels; controlling, by the controller, a hybrid starter-generator to operate by controlling the engine to start depending on the engine start command when it is determined that the gradient of the road is present; and controlling, by the controller, electric power of the hybrid starter-generator to charge a battery which provides electric power to a motor. The controller controls an engine clutch so that the motor is not engaged with the engine.

12 Claims, 6 Drawing Sheets

(51) Int. Cl.
  *B60W 10/08* (2006.01)
  *B60W 20/20* (2016.01)
  *B60K 6/442* (2007.10)
  *B60W 20/11* (2016.01)
(52) U.S. Cl.
  CPC ............ *B60W 10/08* (2013.01); *B60W 20/11* (2016.01); *B60W 2510/0652* (2013.01); *B60W 2510/082* (2013.01); *B60W 2520/105* (2013.01); *B60W 2540/10* (2013.01); *B60W 2550/142* (2013.01); *B60W 2710/021* (2013.01); *B60W 2710/0644* (2013.01); *B60W 2710/081* (2013.01); *Y02T 10/48* (2013.01); *Y02T 10/6234* (2013.01); *Y02T 10/6286* (2013.01); *Y10S 903/93* (2013.01)
(58) Field of Classification Search
  CPC ....... B60W 2540/10; B60W 2710/021; B60W 2550/142; B60W 2710/081; Y02T 10/6234
  See application file for complete search history.

(56) References Cited

U.S. PATENT DOCUMENTS

| | | | | |
|---|---|---|---|---|
| 2013/0296102 A1* | 11/2013 | Banker | ............... | B60W 10/196 477/4 |
| 2013/0296121 A1* | 11/2013 | Gibson | ................ | F02D 41/022 477/5 |
| 2013/0296125 A1* | 11/2013 | Gibson | ................ | B60W 20/10 477/5 |
| 2013/0296130 A1* | 11/2013 | Banker | ............... | B60W 10/184 477/27 |
| 2013/0297161 A1* | 11/2013 | Gibson | ................ | B60W 20/00 701/54 |
| 2013/0297191 A1* | 11/2013 | Gibson | ............... | F02N 11/0855 701/112 |
| 2013/0297193 A1* | 11/2013 | Morisaki | ................ | B60K 6/445 701/112 |
| 2014/0018207 A1* | 1/2014 | Kobayashi | ............... | B60K 6/48 477/5 |
| 2014/0046525 A1* | 2/2014 | Lee | ........................ | B60W 10/10 701/22 |
| 2014/0100730 A1* | 4/2014 | Park | ........................ | B60W 10/06 701/22 |
| 2014/0303819 A1* | 10/2014 | Aoki | ................... | B60L 11/1861 701/22 |
| 2015/0051766 A1* | 2/2015 | Matsui | ..................... | B60K 6/48 701/22 |
| 2017/0082012 A1* | 3/2017 | Jang | ........................ | B60K 6/26 |
| 2017/0291599 A1* | 10/2017 | Pietron | ................ | B60W 20/40 |

FOREIGN PATENT DOCUMENTS

| | | |
|---|---|---|
| KR | 10-2013-0017723 A | 2/2013 |
| KR | 10-2013-0074193 A | 7/2013 |

* cited by examiner

METHOD AND DEVICE FOR CONTROLLING START TIME OF ENGINE IN HYBRID VEHICLE

CROSS-REFERENCE TO RELATED APPLICATION

This application claims under 35 U.S.C. §119(a) the benefit of Korean Patent Application No. 10-2015-0087557 filed in the Korean Intellectual Property Office on Jun. 19, 2015, the entire contents of which are incorporated herein by reference.

BACKGROUND (a) Field of the Invention

The present invention relates to a hybrid vehicle (or a hybrid electric vehicle), and more particularly, to a method and a device for controlling a start time of an engine in the hybrid vehicle.

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and a battery that both generate power. In other words, the hybrid vehicle efficiently combines and uses power of the internal combustion engine and power of the motor.

The hybrid vehicle may include an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle may include a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor; a hybrid vehicle (HEV) mode, which uses rotational force of the engine as main power and uses rotational force of the motor as auxiliary power; and a regenerative braking (RB) mode for collecting braking and inertial energy during driving by braking or inertia of the vehicle through electricity generation of the motor to charge the battery.

The above information disclosed in this section is only for enhancement of understanding of the background of the invention and therefore it may contain information that does not form the prior art that is already known in this country to a person of ordinary skill in the art.

SUMMARY

The present invention provides a method and a device for controlling a start time of an engine in a hybrid vehicle which are capable of determining the start time (or drive point) of the engine depending on revolutions per minute (RPM) of a motor (or a driving motor) and driving conditions of the hybrid vehicle.

An exemplary embodiment of the present invention may provide a method for controlling a start time of the engine in the hybrid vehicle, including: generating, by a controller, an engine start command before executing start control of the engine in response to an acceleration signal output from an acceleration pedal sensor; determining, by the controller, a gradient of a road on which the hybrid vehicle travels; controlling, by the controller, a hybrid starter-generator to operate by controlling the engine to start depending on the engine start command when it is determined that the gradient of the road is present; and controlling, by the controller, electric power of the hybrid starter-generator to charge a battery which provides electric power to a motor. The controller may control an engine clutch so that the motor is not engaged with the engine.

The method for controlling the start time of the engine in the hybrid vehicle may further include: calculating, by a controller, a combined number of revolutions per minute of the motor which is combined with the engine through the engine clutch based on a rising slope of a revolution number per minute of the engine and a rising slope of a revolution number per minute of the motor when it is determined that the gradient of the road is not present; and controlling, by the controller, the engine to start before a minimum time of a time during which the engine reaches the combined number of revolutions per minute depending on the rising slope of the revolution number per minute of the engine. The combined number of revolutions per minute of the motor may be equal to a target revolution number per minute of the engine.

The method for controlling the start time of the engine in the hybrid vehicle may further include controlling, by the controller, the motor to have the combined number of revolutions per minute in response to the acceleration signal output from the acceleration pedal sensor.

The controller may include a motor controller which controls the motor, and may include a hybrid controller which controls the motor controller and the engine.

The controller may control the engine to start through the hybrid starter-generator.

The controller may determine the gradient of the road by using acceleration of the hybrid vehicle provided by an acceleration sensor.

An exemplary embodiment of the present invention may provide a device for controlling a start time of the engine in the hybrid vehicle, including: an acceleration pedal sensor which detects operation of an accelerator pedal; an acceleration sensor which detects acceleration of the hybrid vehicle; and a controller which generates an engine start command before executing start control of the engine in response to an acceleration signal output from the acceleration pedal sensor and determines a gradient of a road on which the hybrid vehicle travels based on acceleration provided by the acceleration sensor. The controller may control a hybrid starter-generator to operate by controlling the engine to start depending on the engine start command when it is determined that the gradient of the road is present, and may control electric power of the hybrid starter-generator to charge a battery which provides electric power to a motor and may control an engine clutch so that the motor is not engaged with the engine.

The controller may calculate a combined number of revolutions per minute of the motor which is combined with the engine through the engine clutch based on a rising slope of a revolution number of the engine and a rising slope of a revolution number of the motor when it is determined that the gradient of the road is not present, and may control the engine to start before a minimum time of a time during which the engine reaches the combined number of revolutions per minute depending on the rising slope of revolution number of the engine. The combined number of revolutions per minute of the motor may be equal to a target revolution number of the engine.

The controller may control the motor to have the combined number of revolutions per minute in response to the acceleration signal output from the acceleration pedal sensor.

The controller may include a motor controller which controls the motor, and may include a hybrid controller which controls the motor controller and the engine.

The controller may control the engine to start through the hybrid starter-generator.

A non-transitory computer readable medium containing program instructions executed by a processor may include: program instructions that generate an engine start command before executing start control of the engine in response to an acceleration signal output from an acceleration pedal sensor; program instructions that determine a gradient of a road on which the hybrid vehicle travels; program instructions that control a hybrid starter-generator to operate by controlling the engine to start depending on the engine start command when it is determined that the gradient of the road is present; and program instructions that control electric power of the hybrid starter-generator to charge a battery which provides electric power to a motor, wherein an engine clutch is controlled so that the motor is not engaged with the engine.

The method and the device for controlling start time of the engine in the hybrid vehicle according to the exemplary embodiment of the present invention may prevent unnecessary loss of energy that is not used for driving of the hybrid vehicle, and may ensure state of charge (SOC) balancing regarding a battery by optimizing the start time of the engine. Accordingly, fuel efficiency of the hybrid vehicle may be effectively improved.

When the embodiment of the present invention is applied to the hybrid vehicle, noise, vibration, and harshness (NVH) ability or drivability of the hybrid vehicle may be improved while the hybrid vehicle is traveling on an uphill road in an electric vehicle mode. Further, power of the engine may be used to charge a high voltage battery that provides electric power to the motor without being used for driving of the hybrid vehicle, and thus the SOC balancing may be ensured.

BRIEF DESCRIPTION OF THE DRAWINGS

A brief description of the drawings will be provided to more sufficiently understand the drawings which are used in the detailed description of the present invention.

DETAILED DESCRIPTION OF THE EMBODIMENTS

Figure 1:
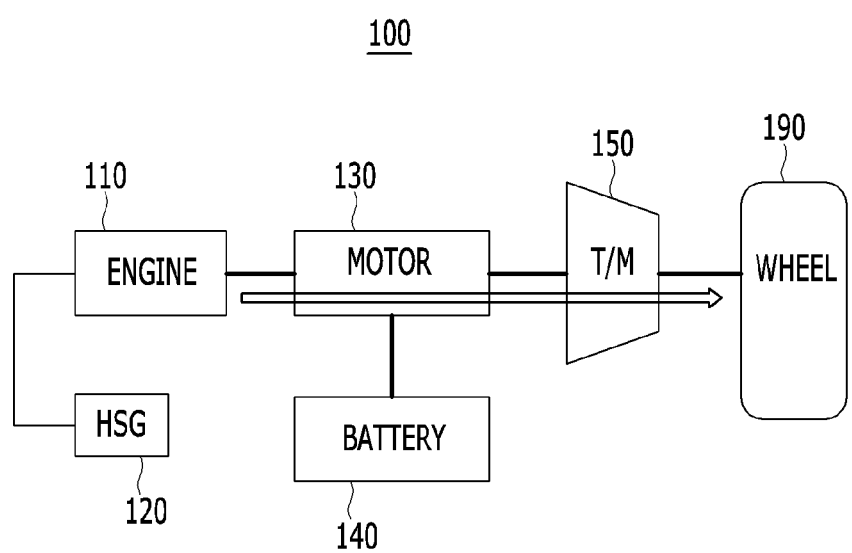
FIG. 1 is a block diagram of a method for controlling start time of an engine in a hybrid vehicle according to an exemplary embodiment of the present invention.

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A transmission mounted electric device (TMED) hybrid vehicle that is a TMED system travels during initial launch by using a driving force of an electric motor that uses electric power of a battery. When there is great demand force corresponding to an acceleration operation of the TMED hybrid vehicle, the TMED hybrid vehicle starts the engine and engages (or combines) a clutch between a motor (or a driving motor) and the engine to transfer a driving force of the engine to a driving part.

A hybrid vehicle such as the TMED hybrid vehicle, unlike a regular gasoline vehicle, uses a high level of engine torque after starting the engine to improve fuel efficiency of the hybrid vehicle and ensure state of charge (SOC) balancing. However, accuracy of the torque of the engine falls at low revolutions per minute (RPM) of the engine because of characteristic of the engine. If high engine torque is used (or generated) at the low RPM of the engine, noise, vibration, and harshness (NVH) ability deteriorates. Particularly, if power of the engine is used under a low amount of movement of an accelerator pedal when the hybrid vehicle travels on an uphill road in which a traveling load is high, a driver of the hybrid vehicle feels large booming and large vibration of the engine in spite of the low amount of movement of the accelerator pedal.

Accordingly, if the hybrid vehicle travels in an electric vehicle mode (EV mode) when the hybrid vehicle travels on the uphill road, ride comfort and NVH ability (or NVH performance) are improved. However, energy consumption of a high voltage battery that is used in the uphill road is higher than that of the high voltage battery that is used in a flat road or a downhill road, and thus fuel efficiency of the hybrid vehicle deteriorates.

When the hybrid vehicle travels on an uphill road in a parking lot or a city, the hybrid vehicle uses power of the engine despite driving of the hybrid vehicle according to the low amount of movement of the accelerator pedal to maintain a high state of charge (SOC) of the high voltage battery. In the driving mode, operation of the accelerator pedal occurs frequently, and thus engagement of the clutch or release of the clutch occurs frequently. In addition, speed of the hybrid vehicle that travels on the uphill road drops faster than that of the hybrid vehicle that travels on the flat road or the downhill road due to slope of the uphill road. When speed of the hybrid vehicle or speed of wheels of the hybrid vehicle drops quickly, RPM of the engine and the motor also drop quickly. Further, forced engagement of the clutch may occur before ending a release sequence of the clutch (or before reducing hydraulic pressure of the clutch). The forced engagement of the clutch causes a large vibration of the vehicle.

If the hybrid vehicle travels in the EV mode without starting the engine, a problem such as vibration of the vehicle does not occur. However, the SOC of the battery rapidly decreases due to a condition in which the traveling load is large. The level of the SOC in the hybrid vehicle is directly related to fuel efficiency (or fuel economy) and is an important factor thereof. Accordingly, when the hybrid vehicle travels on the uphill road only in the EV mode, the hybrid vehicle uses power of the engine to induce charge of the battery in order to maintain the SOC level. To use power of the engine to induce charge of the battery imparts an adverse effect on fuel efficiency of the vehicle on a real road.

The related art described above may not achieve improvement of the NVH ability and the SOC balancing on the uphill road.

To maintain accuracy of the torque and improve the NVH ability, the hybrid vehicle does not perform engagement control of the clutch in a region in which RPM of the motor is very low. In other words, the hybrid vehicle engages the clutch with reference to RPM of the motor regardless of start of the engine. If the engine starts at a very low speed of the motor, the engine maintains an idle state until RPM of the motor becomes RPM that is higher than the very low RPM. The idle state of the engine worsens the fuel efficiency.

In the control of the hybrid electric vehicle, the start time of the engine may be determined by only a request of the driver or a state of the vehicle without considering characteristic of the engine. Start of the engine may be executed when the driver shows acceleration will by stepping on the accelerator pedal connected to an acceleration position sensor (APS) or when power of the engine needs to be used due to low SOC of the battery.

However, available power (or torque) of the engine may be limited depending on the number of revolutions per minute of the engine and accuracy of the power of the engine may be reduced. Further high power at a low number of revolutions per minute of the engine results in an adverse effect on the NVH ability.

Moreover, because the engine of the hybrid vehicle that is used for driving of the vehicle, charging of the battery, etc. generates high torque after startup of the engine, number of revolutions per minute of the engine is a very important factor.

Thus, although the engine starts due to the driver's acceleration will and state of the vehicle in the TMED system, the clutch may not be engaged in a region in which number of revolutions per minute of the motor is very low. Accordingly, the engine maintains the idle state until RPM of the motor becomes RPM at which the clutch may be engaged. The idle state of the engine worsens the fuel efficiency. In more detail, the accelerator pedal is depressed by the driver, and thus the engine may generate energy that is not used for driving of the hybrid vehicle.

If engagement time in which the clutch may be engaged is determined (or predicted) and start (or start time) of the engine is optimized with reference to the engagement time in order to maintain accuracy of power of the engine and improve the NVH ability as an embodiment of the present invention described below, fuel efficiency of the vehicle may be improved in the TMED system.

Figure 2:
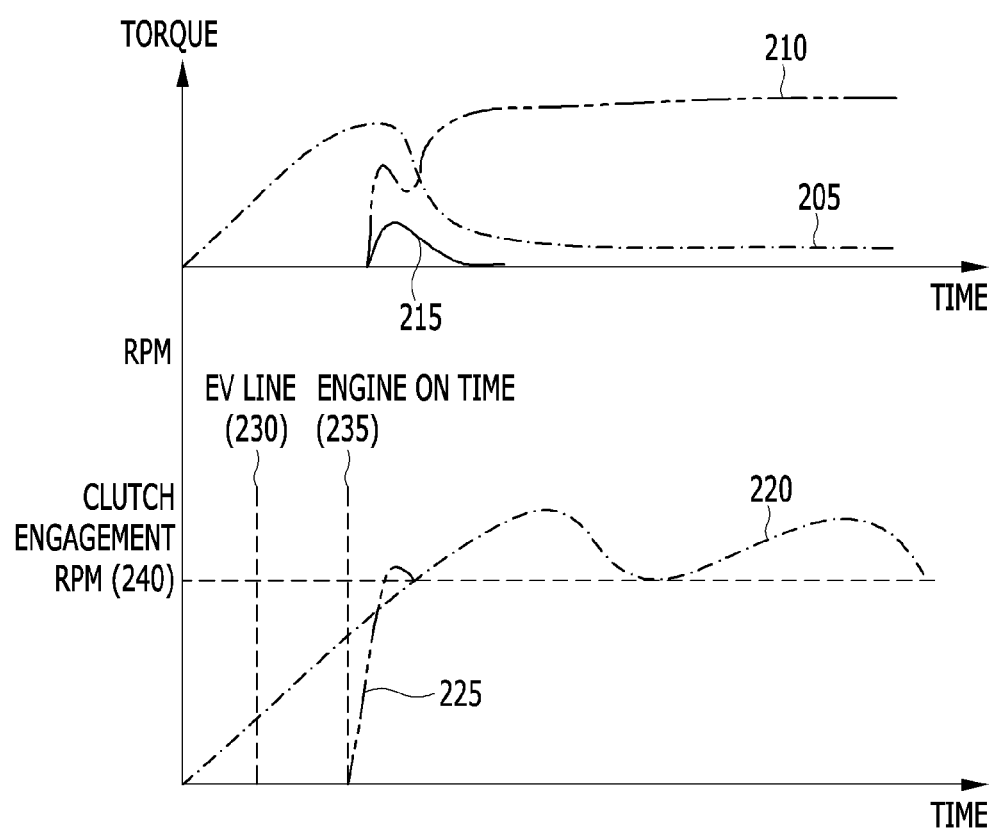
FIG. 2 is a graph for explaining an operation according to the method for controlling the start time of the engine in the hybrid vehicle shown in FIG. 1.
Figure 5:
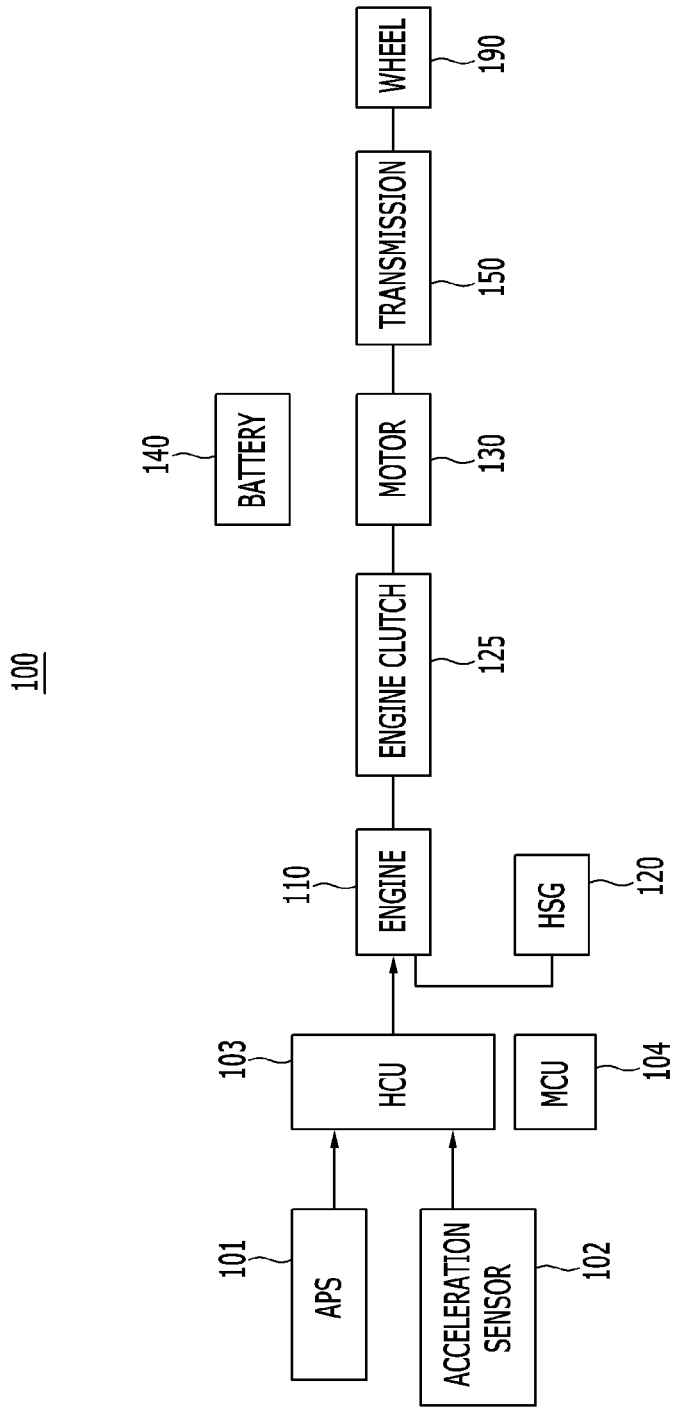
FIG. 5 is a block diagram for describing the hybrid vehicle including a device for controlling the start time of the engine according to an exemplary embodiment of the present invention.

FIG. 1 is a block diagram of a method for controlling a start time of an engine in a hybrid vehicle according to an exemplary embodiment of the present invention. FIG. 2 is a graph for explaining an operation according to the method for controlling the start time of the engine in the hybrid vehicle shown in FIG. 1. FIG. 5 is a block diagram for describing the hybrid vehicle including a device for controlling the start time of the engine according to an exemplary embodiment of the present invention.

The method for controlling the start time of the engine in the hybrid vehicle (or a hybrid electric vehicle) may be a start control of the engine that is based on whether a clutch (or an engine clutch) is engaged (or locked up) in a transmission mounted electric device (TMED) system, and may determine the start time (or drive point) of the engine depending on revolutions per minute (RPM) of a motor (or a driving motor).

In addition, the method for controlling the start time of the engine in the hybrid vehicle may be electric power generation control that uses a hybrid starter-generator (HSG) and is based on whether the engine clutch may be engaged in the TMED system, and may realize an electric vehicle mode (EV mode) and state of charge (SOC) maintenance of a high voltage battery when the hybrid vehicle travels on an uphill road.

In the TMED system (or a TMED hybrid vehicle), the clutch 125 is disposed between the engine 110 and the motor 130 as shown in FIG. 5, and thus the TMED system may travel by only power of the motor 130 in a low speed or constant speed region without engaging the clutch 125. The TMED system may engage the clutch 125 to travel by using force of the engine and force of the motor in a high speed or high load region.

Referring to FIGS. 1, 2, and 5, the present invention may optimize a start time 235 of the engine on the basis of RPM 240 when the clutch may be engaged. FIGS. 1 and 2 describe the method for controlling the start time of the engine when the hybrid vehicle travels on a flat road or a downhill road in a state in which an accelerator pedal is slightly depressed. In FIG. 2, reference numeral 205 indicates torque of the motor 130, reference numeral 210 indicates torque of the engine 110, and reference numeral 215 indicates torque of the hybrid starter-generator (HSG) 120 to start the engine.

According to the present invention, it is possible to control the start time of the engine with reference to a rising rate (or rising slope) of speed of the vehicle or a rising slope of RPM 220 of the motor at an electric vehicle line (EV line) 230 at which an engine start command for conversion to a hybrid electric vehicle (HEV) mode occurs.

In the engine of the hybrid vehicle, it may take about 200 ms-300 ms to generate power by supplying air and a fuel to a cylinder of the engine after start of the engine.

The number of revolutions per minute 225 of the engine should be controlled to be equal to number of revolutions per minute 220 of the motor so that the clutch may be engaged. If the engine is engaged (or connected) to the motor through the clutch when there is a difference between number of revolutions per minute of the engine and number of revolutions per minute of the motor, shock and jerk may occur in the vehicle and drivability of the vehicle may deteriorate. Since the motor is connected to a driving system via a transmission, rotation speed of the motor is closely related to speed of the vehicle.

It may take about 200 ms-300 ms to synchronize a target number of revolutions per minute 225 of the engine with a number of revolutions per minute 220 of the motor after start of the engine in order to engage the clutch. That is, it may take about 500 ms-700 ms or more to prepare engagement of the clutch after generation of the engine start command. If rising slope of RPM 220 of the motor is large, the start time 235 of the engine should be set ahead so that the clutch may be engaged at a correct number of revolutions per minute for engagement.

The start time 235 of the engine under all operating conditions should be optimized. However, the start time of the engine under actual operating conditions may not be optimized due to various road conditions and driving patterns. The present invention may generate the engine start command at the EV line 230, and then may determine the final start time 235 of the engine with reference to the number of revolutions per minute of the motor. Engagement time of the clutch may be optimized through such control.

Figure 3:
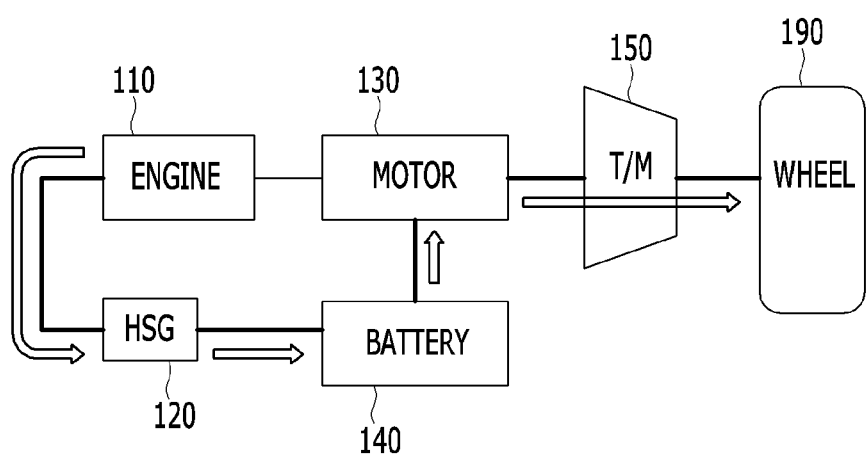
FIG. 3 is a block diagram of the method for controlling the start time of the engine in the hybrid vehicle according to another exemplary embodiment of the present invention.
Figure 4:
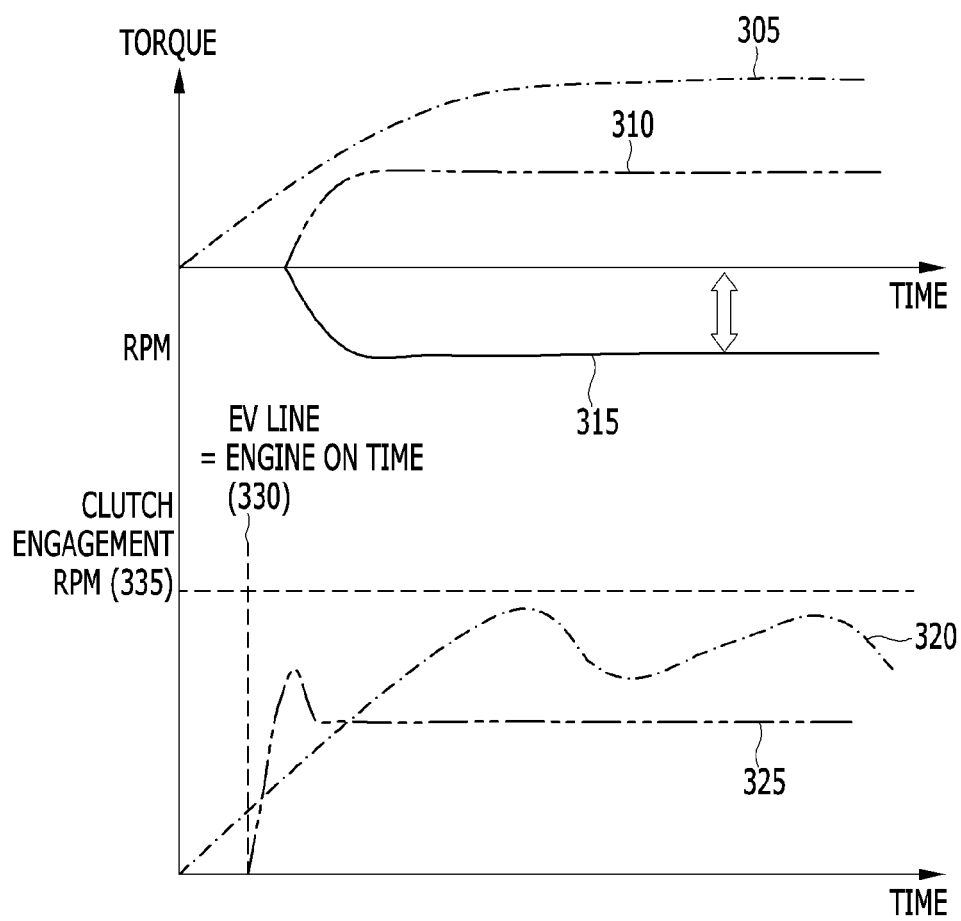
FIG. 4 is a graph for describing an operation according to the method for controlling the start time of the engine in the hybrid vehicle shown in FIG. 3.

FIG. 3 is a view for describing a method for controlling the start time of the engine in the hybrid vehicle according to another exemplary embodiment of the present invention. FIG. 4 is a graph for describing an operation according to the method for controlling the start time of the engine in the hybrid vehicle shown in FIG. 3. FIGS. 3 and 4 describe the method for controlling the start time of the engine when the hybrid vehicle travels on the uphill road under a state in which the accelerator pedal is slightly depressed. In FIG. 4, reference numeral 305 indicates torque of the motor 130, reference numeral 310 indicates torque of the engine 110, and reference numeral 315 denotes torque of the hybrid starter-generator (HSG) 120 to charge a battery.

Referring to FIGS. 3-5, the embodiment of the present invention may determine whether the hybrid vehicle travels on the uphill road. When the hybrid vehicle travels on the uphill road, the present invention may set clutch engagement RPM 335 at which the clutch 125 may be engaged to be higher than clutch engagement RPM 240 described with reference to FIG. 2.

If the level of clutch engagement RPM 335 is high even if the engine 110 receives an engine-on command that corresponds to the EV line 330 for conversion to the HEV mode, engine start control of the hybrid vehicle described with reference to FIG. 1 and FIG. 2 may not start the engine until number of revolutions per minute 320 of the motor 130 becomes clutch engagement RPM 335. Accordingly, because the hybrid vehicle travels in the EV mode, state of charge (SOC) balancing may deteriorate.

Thus, as shown in FIG. 3, if the clutch is not engaged in a state in which the engine starts (or operates) in a transition region between RPM 325 corresponding to the EV line 330 and the clutch engagement RPM 335 and if the high voltage battery 140 is charged by the HSG 120 that uses power of the engine 110, travelling in the EV mode and the SOC balancing may be satisfied.

FIG. 5 is a block diagram for describing the hybrid vehicle including the device for controlling the start time of the engine in the hybrid vehicle according to the exemplary embodiment of the present invention.

Referring to FIG. 5, the hybrid vehicle 100 includes an acceleration pedal sensor (or an acceleration pedal position sensor) 101, an acceleration sensor 102, a hybrid control unit (HCU) 103, a motor control unit (MCU) 104, the engine 110, the hybrid starter-generator (HSG) 120, the engine clutch 125, the battery 140, the motor 130 which may be an electric motor, a transmission 150, and wheels (or driving wheels) 190. In another embodiment of the present invention, the hybrid vehicle 100 may further include an engine control unit (ECU) that controls operation of the engine 110. The ECU may control an operating point (or a driving point) of the engine 110 through a network depending on a control signal output from the hybrid control unit (HCU) 103, and may control the engine to output an optimal torque. The engine control unit (ECU) may be included in the hybrid control unit (HCU) 103.

The hybrid vehicle 100 may include a power train of the TMED type in which the motor 130 is connected to the transmission 150. The hybrid vehicle 100 may provide a driving mode, such as the EV mode, which is an electric vehicle mode using only power of the motor, and the HEV mode, which uses rotational force of the engine as main power and uses rotational force of the motor as auxiliary power depending on whether the engine clutch 125 that is disposed between the engine 110 and the motor 130 is engaged. In more detail, in the hybrid vehicle 100 including a structure in which the motor 130 may be directly connected to the transmission 150, RPM of the engine may be increased by drive of the HSG 120, power delivery and power cutoff between the engine and the motor may be performed via engagement and release of the clutch 125, a driving force may be transmitted (or transferred) to the wheels 190 through a power transmission system which may include the transmission 150, and torque of the engine may be transmitted to the motor via engagement of the clutch 125 when transmission of the engine torque is requested.

The acceleration pedal sensor (APS) 101 may detect (or sense) an operation of the accelerator pedal by the driver, and may provide a signal corresponding to an operating force that is applied to the accelerator pedal to the hybrid control unit (HCU) 103.

The acceleration sensor 102 may detect acceleration of the hybrid vehicle 100, and may include a micro-electro-mechanical systems (MEMS) acceleration sensor.

The hybrid control unit (HCU) 103 may be the highest controller, and may synthetically control controllers (for example, the MCU 104) connected to the network such as a controller area network (CAN) which is a vehicle network, and may control overall operation of the hybrid vehicle 100.

The hybrid control unit (HCU) 103 may calculate the driver's requested power, may determine start of the engine, and may generate the engine start command internally before start control of the engine 100 in response to an acceleration signal output from the acceleration pedal sensor (APS) 101. The hybrid control unit (HCU) 103 may determine a gradient (or inclination) of a road on which the hybrid vehicle 100 travels based on acceleration provided by the acceleration sensor 102. The gradient of the road may mean tilt angle of the hybrid vehicle 100.

The hybrid control unit (HCU) 103 may control the hybrid starter-generator 120 to operate by controlling the engine 110 to start depending on the engine start command generated at engine-on time 330 in FIG. 4 when it is determined that the gradient (or the gradient value) of the road is present. The hybrid control unit (HCU) 103 may control electric power of the hybrid starter-generator 120 to charge the battery 140 which provides electric power (or direct current power) to the motor 130, and may control the engine clutch 125 so that the motor 130 that provides a driving force to the wheels 190 is not engaged with the engine 110. As a result, only power of the motor 130 may be transmitted to the wheels 190 through the transmission 150, as shown in FIG. 3.

The hybrid control unit (HCU) 103 may calculate (or estimate) a combined number of revolutions per minute (for example, the clutch engagement RPM 240 in FIG. 2) of the motor 130 which is combined (or engaged) with the engine 110 through the engine clutch 125 based on a rising slope of the revolution number per minute of the engine and a rising slope of the revolution number per minute of the motor when it is determined that the gradient of the road is not present. The revolution number per minute of the motor may be output from the motor control unit (MCU) 104. The combined number of revolutions per minute of the motor 130 may be equal to a target revolution number per minute of the engine 110. The rising slope of the revolution number per minute of the engine may be detected by an engine rotation speed sensor (not shown) that may be connected to the engine 110, and may be provided to the hybrid control unit (HCU) 130.

The hybrid control unit (HCU) 103 may set the combined number of revolutions per minute (for example, the clutch engagement RPM 335 in FIG. 4) of the motor 130 that is generated when the gradient of the road is present to be higher than combined number of revolutions per minute (for example, the clutch engagement RPM 240 in FIG. 2) of the motor 130 that is generated when the gradient of the road is not present.

The hybrid control unit (HCU) 103 may control the engine 110 to start (or operate) via the HSG 120 before a minimum time (for example, the engine-on time 235 in FIG. 2) of a time during which the engine reaches the combined number of revolutions per minute depending on the rising slope of revolution number per minute of the engine. That is, the hybrid control unit (HCU) 103 may apply a final engine start command to the engine 110 at the engine-on time 235 shown in FIG. 2. After the final engine start command is applied, power of the engine 110 and the motor 130 may be transmitted to the wheels 190 through the transmission 150, as shown in FIG. 1. The HSG 120 may start the engine or may operate as an electric generator by using power (or output) of the engine to charge the battery 140. The HSG 120 may also be referred to as an integrated starter and generator (ISG).

The motor control unit (MCU) 104 may control the motor 130 to have the combined number of revolutions per minute in response to the acceleration signal (or operation signal of the accelerator pedal) output from the acceleration pedal sensor (APS) 101.

The motor control unit (MCU) 104 may calculate the rising slope of the revolution number per minute of the motor and may control the operation of the motor 130. The rising slope of the revolution number per minute of the motor may be detected by a motor rotation speed sensor (not shown) that may be connected to the motor 130, and may be provided to the motor control unit (MCU) 104.

The motor control unit (MCU) 104 may control an output torque of the driving motor 130 through the network depending on the control signal output from the hybrid control unit (HCU) 103, and thus may control the motor to operate at maximum efficiency. The motor control unit (MCU) 104 may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The motor control unit (MCU) 104 may be disposed between the battery 140 and the motor 130.

The engine 110 may include a diesel engine, a liquefied natural gas (LNG) engine, or a liquefied petroleum gas (LPG) engine, and may output a torque at the operating point depending on a control signal output from the ECU. The torque may be combined with driving force of the driving motor 130 in the HEV mode.

The HSG 120 may operate as a motor depending on a control signal output from the MCU 104 to start the engine 110, and may operate as a generator in a state in which start of the engine 110 is maintained to provide generated electric power to the battery 140 via the inverter. The HSG 120 may be connected to the engine 110 through a belt.

The engine clutch 125 may be disposed (or mounted) between the engine 110 and the driving motor 130, and may be operated depending on control of the HCU 103 to switch power delivery between the engine 110 and the motor 130. The engine clutch 125 may connect or intercept power between the engine and the motor depending on switching of the HEV mode and the EV mode.

The battery 140 may include a plurality of unit cells. A high voltage for providing a driving voltage (for example, 350-450 V DC) to the motor 130 may be stored in the battery 140.

The motor 130 may be operated by a three-phase AC voltage that is output from the MCU 104 to generate a torque. The motor 130 may be operated as a generator during coasting drive or regenerative braking to supply a voltage (or regenerative energy) to the battery 140.

The transmission 150 may include an automatic transmission (or a multiple speed transmission) or a continuously variable transmission (CVT), and may shift to a desired gear by using hydraulic pressure depending on control of a transmission controller (not shown) to operate engagement elements and disengagement elements. The transmission 150 may transmit driving force of the engine 110 and/or the motor 130 to the wheels 190, and may intercept power delivery between the motor 130 (or the engine 110) and the wheels 190.

In another embodiment of the present invention, the HCU 103 and the MCU 104 (or the HCU 103, the MCU 104, and the ECU) may be integrated into a single controller. In this embodiment, the controller may perform operation of the HCU 103 and the MCU 104 described above. The device for controlling the start time of the engine in the hybrid vehicle may include the controller, the APS 101, and the acceleration sensor 102.

For example, the controller may be one or more microprocessors operated by a program or a hardware including the microprocessor. The program may include a series of commands for executing the method for controlling the start time of the engine in the hybrid vehicle according to the exemplary embodiment of the present invention, which will be described below.

With reference to FIGS. 1-5, the method for controlling the start time of the engine in the hybrid vehicle is described as follows.

The method for controlling the start time of the engine may be applied to the hybrid vehicle shown in FIG. 5, and may include an operation for controlling the start time of the engine shown in FIG. 2 and FIG. 4.

The method for controlling the start time of the engine may include a generation step, a determination step, and a control step.

Referring to FIGS. 1 through 5, in the generating step, the controller may generate the engine start command internally before start control of the engine 110 in response to the acceleration signal output from the APS 101.

According to the determination step, the controller may determine gradient of the road on which the hybrid vehicle 100 travels. The gradient of the road may also indicate tilt angle of the hybrid vehicle 100. The controller may determine the gradient of the road by using acceleration of the hybrid vehicle 100 that is provided by the acceleration sensor 102.

According to the control step, the controller may control the HSG 120 to operate by controlling the engine 110 to start depending on the engine start command when it is determined that the gradient of the road is present. The controller may control electric power of the HSG 120 to charge the battery 140 which provides electric power to the motor 130. The controller may control the engine clutch 125 so that the motor 130 which provides a driving force to the wheels 190 is not engaged with the engine 110.

The controller may calculate (or estimate) a combined number of revolutions per minute of the motor 130 which is combined with the engine 110 through the engine clutch 125 based on the rising slope of the revolution number per minute of the engine and the rising slope of revolution number per minute of the motor when it is determined that the gradient of the road is not present. The combined number of revolutions per minute of the motor 130 may be equal to a target revolution number per minute of the engine 110. The controller may determine whether RPM of the motor 130 is present between the clutch engagement RPM 240 and RPM of the engine that changes depending on the start time and the rising slope. When RPM of the motor 130 is present between the clutch engagement RPM 240 and RPM of the engine according to the start time and the rising slope, the controller may prohibit start of the engine.

The controller may control the engine 110 to start (or operate) before minimum time 235 of a time during which the engine reaches the combined number of revolutions per minute depending on the rising slope of the revolution number per minute of the engine, as shown in FIG. 2. That is, the controller may apply the final engine start command to the engine 110. The controller may control the motor 130 to have the combined number of revolutions per minute in response to the acceleration signal output from the APS 101.

The controller may determine whether the number of revolutions per minute of the motor or the number of revolutions per minute of the engine is higher than the combined number of revolutions per minute of the motor 130 that may be the clutch engagement RPM. Alternatively, the controller may determine whether the number of revolutions per minute of the motor or the number of revolutions per minute of the engine reaches the combined number of revolutions per minute of the motor 130. When the number of revolutions per minute of the motor or the number of revolutions per minute of the engine is higher than the combined number of revolutions per minute of the motor 130, or when the number of revolutions per minute of the motor or the number of revolutions per minute of the engine reaches the combined number of revolutions per minute of the motor 130, the controller may control the amount of hydraulic pressure supplied to the engine clutch 125 through a clutch controller (not shown) so that the engine 110 may be combined with the motor 130.

The controller may include the MCU (or a motor controller) 104 that controls the motor 130, and may include the HCU (or a hybrid controller) 103 that controls the MCU 104 and the engine 110. The controller may control the engine 100 to start through the HSG 120.

Figure 6:
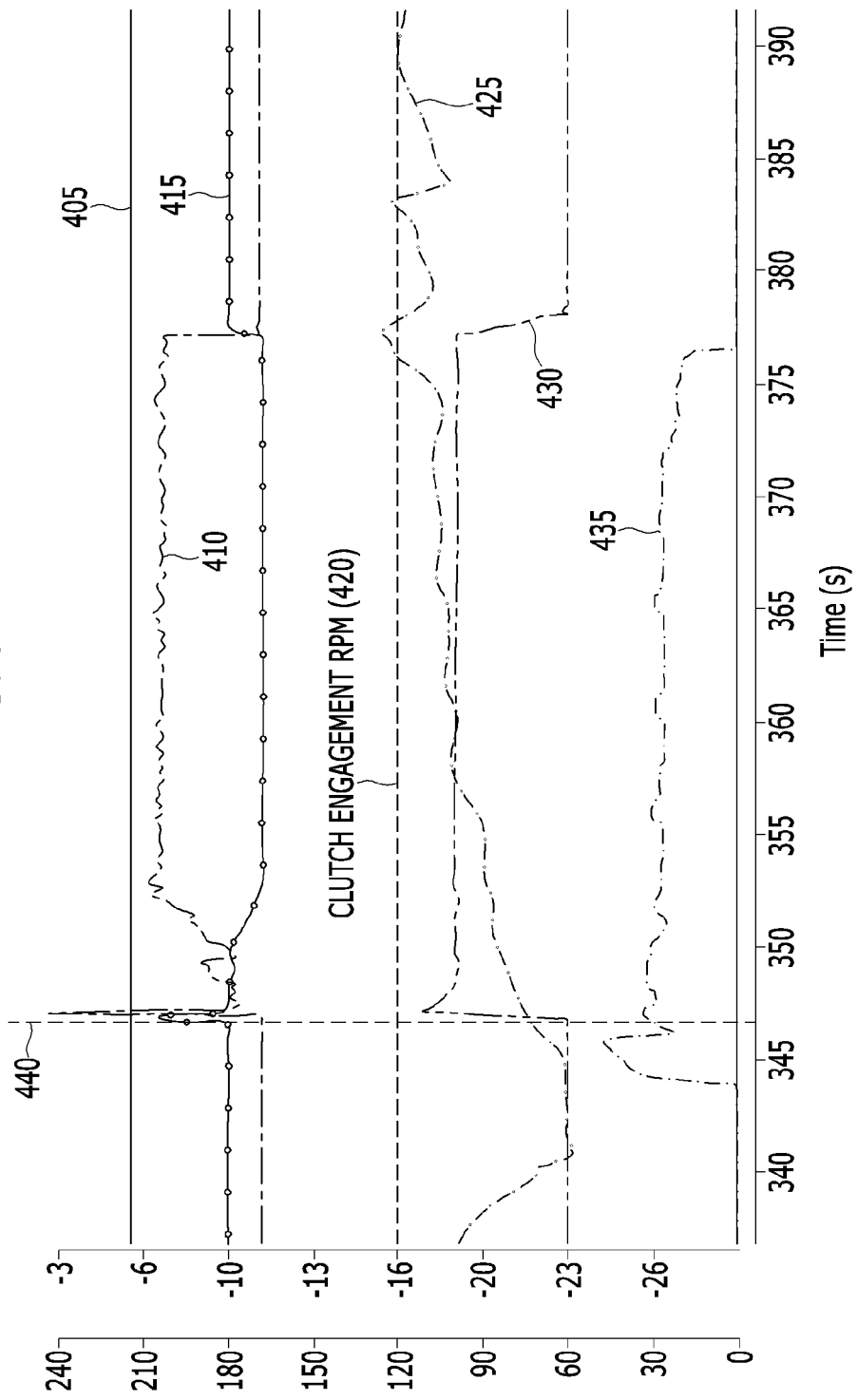
FIG. 6 is a graph for describing a simulation result of the method for controlling the start time of the engine in the hybrid vehicle shown in FIG. 4.

FIG. 6 is a graph for describing a simulation result (or a test result) of the method for controlling the start time of the engine in the hybrid vehicle shown in FIG. 4.

In FIG. 6, reference numeral 405 indicates torque of the motor 130, reference numeral 410 indicates torque of the engine 110, and reference numeral 415 indicates torque of the HSG 120.

Reference numeral 425 may indicate RPM of the motor 130, reference numeral 430 may indicate RPM of the engine 110, and reference numeral 435 may indicate an acceleration signal value of the APS 101. Reference number 440 may represent the engine-on time on the uphill road.

As shown in FIG. 6, if the RPM of the motor does not reach a clutch engagement RPM 420 at which the clutch may be engaged, the present invention may use the HSG 120 to charge the high voltage battery 140 with power (or torque) generated by operation of the engine.

In test conditions corresponding to FIG. 6, the gradient of the road may be 16% (or about 9.2 degrees) and the acceleration signal value of the APS 101 may be about 25%.

As described above, the present invention may start the engine based on the rising rate of RPM of the motor, and may engage the clutch at a number of revolutions per minute of the engine at which the clutch may be engaged. Accordingly, the present invention may reduce waiting time after starting the engine to prevent unnecessary fuel consumption, and may optimize usage of the battery by engaging the clutch at a number of revolutions per minute of the engine at which the clutch may be engaged.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed in a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

What is claimed is:

1. A method for controlling a start time of an engine in a hybrid vehicle, comprising:
   generating, by a controller, an engine start command before executing start control of the engine in response to an acceleration signal output from an acceleration pedal sensor;
   determining, by the controller, a gradient of a road on which the hybrid vehicle travels;
   controlling, by the controller, a hybrid starter-generator to operate by controlling the engine to start depending on the engine start command when it is determined that the gradient of the road is present; and
   controlling, by the controller, electric power of the hybrid starter-generator to charge a battery which provides electric power to a motor,
   wherein the controller controls an engine clutch so that the motor is not engaged with the engine.

2. The method of claim 1, further comprising:
   calculating, by the controller, a combined number of revolutions per minute of the motor which is combined with the engine through the engine clutch based on a rising slope of a revolution number per minute of the engine and a rising slope of revolution number per minute of the motor when it is determined that the gradient of the road is not present; and
   controlling, by the controller, the engine to start before a minimum time of a time during which the engine reaches the combined number of revolutions per minute depending on the rising slope of the revolution number per minute of the engine,
   wherein the combined number of revolutions per minute of the motor is equal to a target revolution number per minute of the engine.

3. The method of claim 2, further comprising
   controlling, by the controller, the motor to have the combined number of revolutions per minute in response to the acceleration signal output from the acceleration pedal sensor.

4. The method of claim 1, wherein the controller includes a motor controller which controls the motor and includes a hybrid controller which controls the motor controller and the engine.

5. The method of claim 1, wherein the controller controls the engine to start through the hybrid starter-generator.

6. The method of claim 1, wherein the controller determines the gradient of the road by using acceleration of the hybrid vehicle provided by an acceleration sensor.

7. A device for controlling a start time of an engine in a hybrid vehicle, comprising:
   an acceleration pedal sensor which detects operation of an accelerator pedal;
   an acceleration sensor which detects acceleration of the hybrid vehicle; and
   a controller which generates an engine start command before executing start control of the engine in response to an acceleration signal output from the acceleration pedal sensor and determines a gradient of a road on which the hybrid vehicle travels based on acceleration provided by the acceleration sensor,
   wherein the controller controls a hybrid starter-generator to operate by controlling the engine to start depending on the engine start command when it is determined that the gradient of the road is present, the controller controls electric power of the hybrid starter-generator to charge a battery which provides electric power to a motor, and the controller controls an engine clutch so that the motor is not engaged with the engine.

8. The device of claim 7, wherein the controller calculates a combined number of revolutions per minute of the motor which is combined with the engine through the engine clutch based on a rising slope of the revolution number per minute of the engine and a rising slope of the revolution number per minute of the motor when it is determined that the gradient of the road is not present, and controls the engine to start before a minimum time of a time during which the engine reaches the combined number of revolutions per minute depending on the rising slope of revolution number per minute of the engine,
   wherein the combined number of revolutions per minute of the motor is equal to a target revolution number per minute of the engine.

9. The device of claim 8, wherein the controller controls the motor to have the combined number of revolutions per minute in response to the acceleration signal output from the acceleration pedal sensor.

10. The device of claim 7, wherein the controller includes a motor controller which controls the motor and includes a hybrid controller which controls the motor controller and the engine.

11. The device of claim 7, wherein the controller controls the engine to start through the hybrid starter-generator.

12. A non-transitory computer readable medium containing program instructions executed by a processor, the computer readable medium comprising:

program instructions that generate an engine start command before executing start control of the engine in response to an acceleration signal output from an acceleration pedal sensor;
program instructions that determine a gradient of a road on which the hybrid vehicle travels;
program instructions that control a hybrid starter-generator to operate by controlling the engine to start depending on the engine start command when it is determined that the gradient of the road is present; and
program instructions that control electric power of the hybrid starter-generator to charge a battery which provides electric power to a motor,
wherein an engine clutch is controlled so that the motor is not engaged with the engine.

* * * * *